Patented Sept. 2, 1969

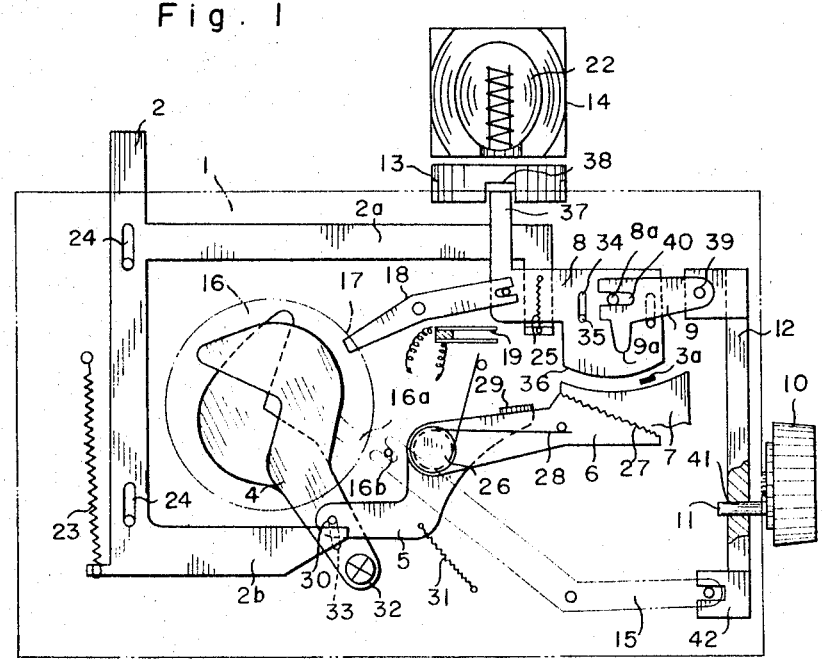

3,464,333
AUTOMATIC EXPOSURE CONTROL CAMERA FOR FLASH AND DAYLIGHT PHOTOGRAPHY
Koichi Aoki and Noboru Yamatani, Toyokawa, and Hideo Takeuchi, Gamagori, Japan, assignors to Minolta Camera Kabushiki Kaisha, Osaka, Japan, a corporation of Japan
Filed Aug. 8, 1966, Ser. No. 570,908
Claims priority, application Japan, Aug. 25, 1965, 40/69,731; Feb. 2, 1966, 41/6,051
Int. Cl. G03b 9/02
U.S. Cl. 95—10     3 Claims

ABSTRACT OF THE DISCLOSURE

An automatic exposure control camera wherein the diaphragm aperture may be determined by locking the angular position of an ammeter pointer upon depressing the release button, the ammeter pointer being adapted to be locked by a pointer-locking means which is connected through a coil spring with the release button. A switch for igniting a lamp indicating that flash-photographing is necessary is closed when said locking means has been lowered by a predetermined stroke, said release button normally being engaged with a pointer-abutting lever the free end of which may be engaged, when said button is lowered to disengage said second arm from the lever and said pointer-abutting lever is angularly moved by means of another spring, with a flash-photographing diaphragm aperture setting member which is angularly moved by means of a distance of focus regulating member, said pointer locking member being adapted to serve as a stop for a flash cube socket and being mechanically linked with a shutter speed regulating member.

---

The present invention relates to an automatic exposure control camera (hereinafter referred to in abridged form as an EE camera) provided with a novel flashing means.

In general, differing from the so-called EE-photographing operation, the distance (R) from the object and corresponding diaphragm or aperture value (f) are determined, in the flash-photographing operation, depending on the guide number (GN) which is dependent on both the light strength of the flash-bulbs and the sensitivity of film. In this case, the shutter speed should be selected in a range between $\frac{1}{30}$ and $\frac{1}{40}$ seconds. When EE-photographing is to be shifted to flash-photographing, the above factors must be considered. However, a quick calculation of $GN/R=f$ in a time of need is frequently mistaken or forgotten. As a result, no appropriate exposure can be obtained and proper exposure will not be obtained.

On the other hand, the shutter speed for usual simple EE camera is a singular value sufficiently high to overcome possible oscillation of the camera and it is coordinated with the brightness of the object to be photographed. In this case, the degree of exposure is adjusted by controlling the diameter of the diaphragm-opening or aperture. Since a small diaphragm opening for an object of high brightness has a natural limitation in view of the image resolving power of lens used, the tolerance of the diaphragm opening and the like, the shutter speed for said object is usually of the order of $\frac{1}{100}$ seconds. On the other hand, since the automatically controlled mechanism of the EE camera is of no use or is not operable beyond the maximum diaphragm or aperture value, flash-photography is necessary for the objects having correspondingly lower brightness. When a simple synchronous mechanism is used for serving simultaneously as a speed light and a flash bulb, X-contact will be usable, and the shutter speed is evidently preferable to be approximately $\frac{1}{30}$–$\frac{1}{40}$ seconds, because of the time lag of the bulb. Therefore, even in a simple camera, it is preferable to provide both high and low velocity ranges, for instance $\frac{1}{100}$ seconds for EE-photographing and $\frac{1}{30}$ second for flash photography. Such a changing-over operation has been performed hitherto-fore manually or automatically, for instance, in connection with removal of a built-in flash gun.

An object of the present invention is to provide an EE camera, wherein the main camera body or casing is charged with a flash cube whereby the automatic change-over of the EE photographing to flash-photographing is made possible, and the charged cube is adapted to be always ready for flash-photographing by revolving same so that after one bulb has been ignited a fresh unignited bulb is moved to the suitable operation position.

Another object of the present invention is to provide an EE camera, wherein, when the brightness of the object to be photographed is low (and accordingly flash-photography is required) the shutter speed can be automatically changed-over from the ordinary high velocity to the low one in order to synchronize with the flash peak.

Thus, the advantage of the present invention is that, when flash-photography is necessary, depending on the condition of the objects to be photographed, a lamp is illuminated automatically to issue a warning and the diameter of the diaphragm opening or aperture is automatically determinated by interlocking with the operation of the adjusting photographing distance. Therefore, automatic flash-photography can be performed by actuating a synchronous contact point, without necessitating any calculation regarding the usual guide number. Moreover, the flash bulb already ignited is retreated and an unignited cube is brought into operative position, in order to await the next ignition, as referred to above, and during EE-photographing the flash bulb is not ignited. Hence, the operation of the camera according to the invention is remarkably simple.

According to another and more specific aspect of the present invention, the shuter speed is regulated to the higher range for photographing without flash bulbs or lower ranged for photographing with flash bulbs, by means of an intermediate engaging device in response to the angular position of a selective ammeter pointer-stopping means which in turn determined by the angular position of the ammeter pointer (whether in the EE-operation range or flash-photographing range) merely by depressing the shutter button.

The present invention will further be described in detail in connection with an embodiment as shown in the accompanying drawing, in which FIG. 1 is a front view of a device for automatically selecting flash-and EE-photographing modes in the camera according to the present invention;

FIG. 2 is a side view of an essential part thereof;

FIG. 6 is a circuit view of said device; and

Figures 3, 4:
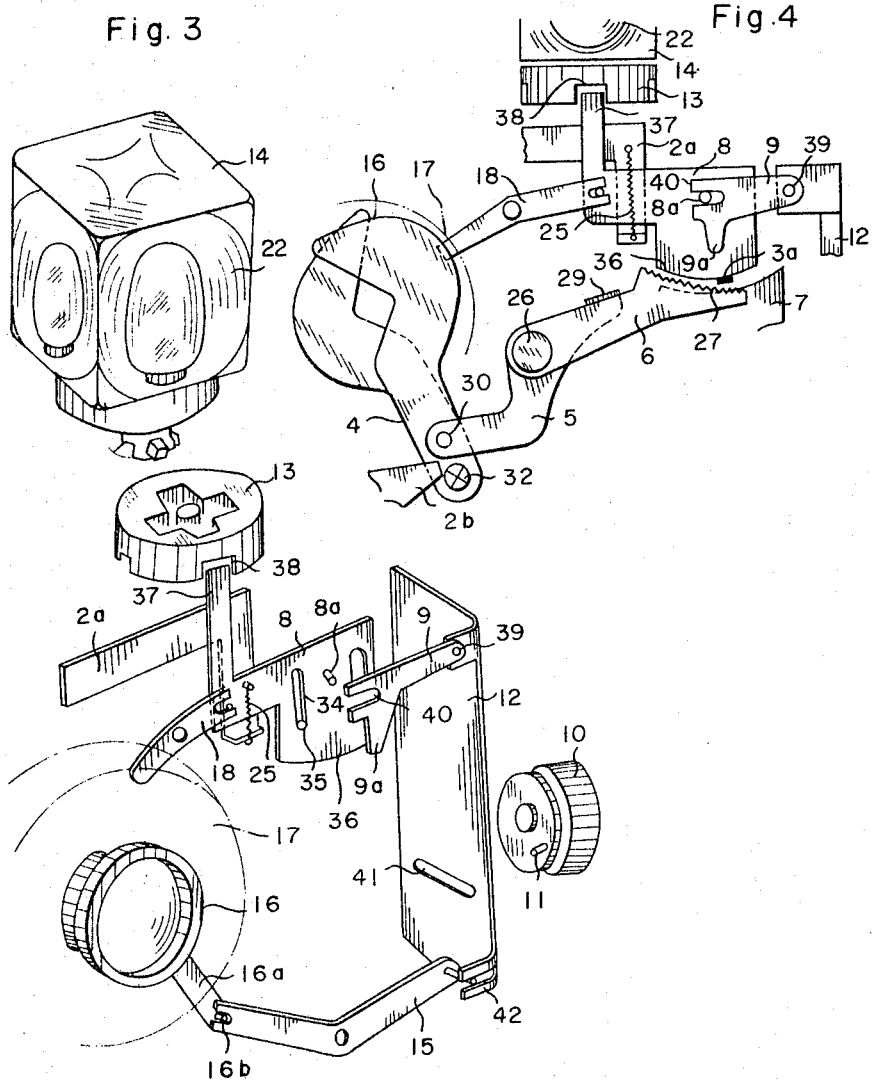
FIG. 3 is an enlarged perspective view thereof.
FIG. 4 is an illustration of the EE-photographing operation in said apparatus.

To begin with, in FIG. 1, the camera body or casing 1 is provided with a release device in the shape of the letter F turned upside down and having an upper longer horizontally extending arm 2a, a lower shorter horizontally extending arm 2b and a vertical bar with an upper end which projects out of the upper wall of the casing so as to form a release push button 2. The release device is normally biased upward by a spring 23 so that when said push button is pushed downward against the action of said spring 23, said device may be moved down along suitable guide means such as slits and pins 24. A pointer 3a of the ammeter 3, shown in FIG. 2, is arranged between a plate 7 secured to said camera body 1 and a vertically slidable locking plate 8 engaged with said upper arm member 2a by means of a spring 25. Further, a pivot pin 26 on the camera body wall 1 is mounted with a pointer lever 6 having a saw-toothed portion 27 on the free end thereof and biassed to rotate counterclockwise on said pin 16 by a spring 28. The pivot pin 26 has concentrically, with said lever 6, a diaphragm-operating bell-crank lever 5 having a folded portion 29 at the extreme end of planted one arm and a top pin 30 planted at the end of the other arm which is normally biassed counter-clockwise by a spring 31. Said folded portion 29 is abutted with said lever 6. Although said pointer-locking lever 6 and said diaphragm-operating lever 5 are formed separately in the illustrated embodiment, they can be formed as one body. Said top pin 30 of diaphragm-operating lever 5 is inserted in a slot 33 which is formed in a pair of diaphragm blades 4 pivoted on a pin 32, to adjust the opening of the diaphragm blades 4 in accordance with the rotation of lever 5. The locking plate 8 is vertically slidable by means of a slot 34 therein and a pin 35 on the casing wall. Lower side 36 of said locking plate 8 and upper side of plate 7 respectively have curvatures corresponding to the circular arc passage of the pointer 3a of the ammeter 3. An upwardly projected portion 37 of said locking plate 8 is inserted in one of the notches 38 of a rotatably mounted socket 13 having a flash cube 14, and a pin 8a on said locking plate is engaged with a forked portion 40 of a flash-diaphragm determining lever 9 pivoted on a pin 39 which is in turn mounted on a sliding plate 12 which may be vertically moved by rotating a focusing knob 10 which is provided at the side wall of the camera body 1.

Moreover, as also shown in FIG. 3, a slot 41 of the sliding plate 12 is engaged with a pin 11 eccentrically on the knob 10, and the lower forked portion 42 is engaged with one end of an intermediate lever 15, while the other end of the lever 15 is engaged with a pin 16b which projects from an arm 16a for helicoidally projecting and withdrawing a lens 16. A shutter speed change lever 18 having a front end related to a slow gear or other well-known controlling mechanism (not shown) is provided between the shutter speed control plate 17 and locking plate 8. In a circut shown in FIG. 6, a switch 19 for a lamp 67 is provided in series with a battery 20, leading from a shutter-synchronous contact 21 to the socket 13 for a flash cube so as to establish a closed circuit for igniting the lamp by a predetermined stroke of the locking plate 8, while, on one hand, bypass circuit leading to the lamp 22 provided in a suitable portion on the camera casing.

The operation of the device having the above construction will be described in the following. If the brightness of the object to be photographed is within the EE photographing range, as shown in FIG. 4, when the release button 2 is pushed down, then locking plate 8 which serves simultaneously as a stopper for socket 13 follows the descending motion under the tension of springs 23 and 25, until the pointer 3a of the ammeter comes to be fixed between locking plate 8 and plate 7.

Further, when the releasing button 2 is further pushed down continuously against said springs 23 and 25, the releasing button disengages and the diaphragm-operating lever from the lower arm 2b thereof. Therefore, the diaphragm blade 4 is opened by means of the diaphragm-operating lever 5 which is biased to rotate counterclockwise and the lever 6, following said operating lever 5, will abut against the pointer 3a to stop the same. Therefore, the diaphragm blade 4 is stopped to define the aperture opening. When the distance from the subject to be photographed is adjusted by revolving the focusing knob 10, on the one hand, the eccentric pin 11 moves sliding plate 12 up or down in cooperation with a slot 41 formed therein and as a result, an intermediate lever 15 engaging therewith actuates helicoidal movements of the photographing lens 16 through the pin 16b and arm 16a to effect focusing. On the other hand, the lever 9 for determining diaphragm opening or aperture for flash photographing, which is independent from the pointer lever 6 is also moved up or down. Shutter speed control plate 17 is set at a fixed speed, for instance 1/100 second, in case the brightness is suitable for EE-photographing and the shutter is released at the end of stroke of releasing button 2.

Figure 5:
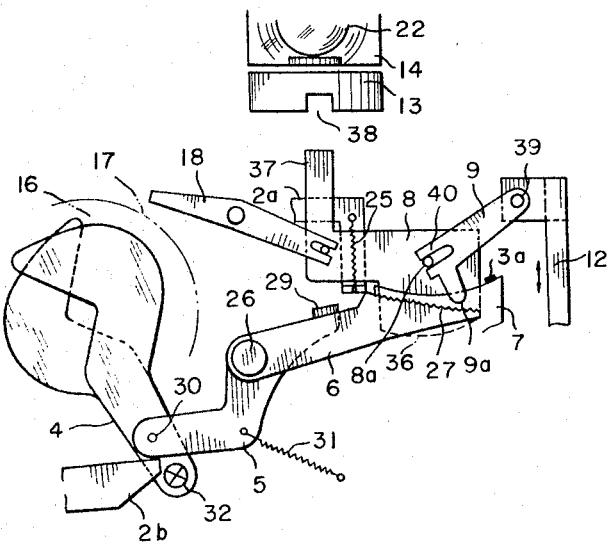
FIG. 5 is a similar illustration of the flash-photographing operation.

In the next situation, when the available brightness is low and a flash operation is required, the pointer 3a is out of the arc portion 36 of the locking plate 8, as shown in FIG. 5, and thus pushing down the release button 2 will cause travel of said locking plate therewith and since the pointer 3a is outside of the range of the descending stroke of plate 8, the latter will be longer than that in case of EE-photographing. During said descending movement, plate 8 actuates the switch 19 to light the lamp 67 and rotate the shutter speed change lever 18 clockwise to set the shutter speed for, instance at 1/30 second, for flash photography. On one hand, the diaphragm operating lever 5 which rotates around the pivot pin 26 counterclockwise in following descending of the lower arm member 2b of the release button 2, operates the diaphragm blade 4 to open the diaphragm aperture thereof, and the pointer-locking lever 6 (operating as one body with said diaphragm-operating lever 5) comes to strike the projection 9a of the flash-photographing diaphragm-determining lever 9 and stop which occurs when the sliding plate 12 is positioned appropriately for focusing, and the diaphragm blade 4 is adjusted for establishing a diaphragm opening corresponding to the distance from the object, and further pushing down of the releasing button 2 releases the shutter whereby the inner synchronous contact point 21 is closed to ignite flash bulb 22, thus enabling photographing. On the other hand, since the locking plate 8 is in the lower position, the upper projecting portion 37 operating as a stop is disengaged from socket 13, and another stop on the other side is disengaged by well-known appropriate means (not shown) during the shutter releasing, and when the releasing button 2 is returned, the socket 13 revolves and a new flash bulb 22 comes to the operative, front position.

Figure 7:
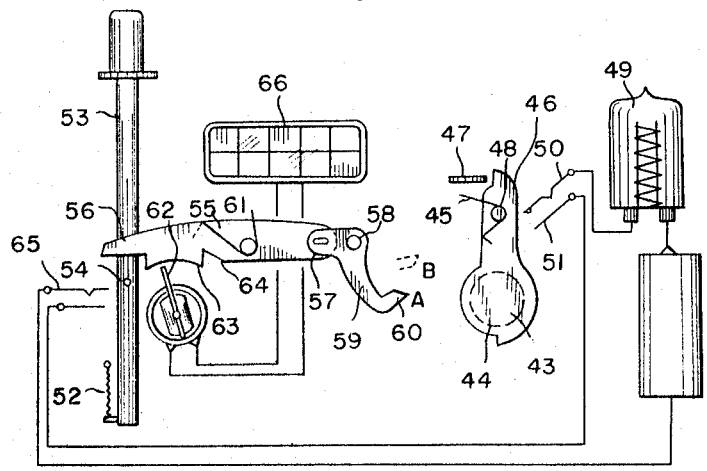
FIG. 7 is a modification of the device shown in FIG. 1, showing a plan view of an automic exchanging device for shutter speed.

FIG. 7 shows a modification of the embodiment shown in FIG. 1, and particularly an automatic shutter speed-changing device, wherein a single bladed shutter 44 covering the lens 43 rocks around the shaft 48 by a conventional driving means 47 energized to move counterclockwise by spring 45 and arranged opposite the rear portion 46. In this case, at the maximum rocking amplitude, i.e. at low speed, the tail portion 46 of said shutter strikes a switch lever 50 of a flash lamp 49 to come in contact with fixed lever 51 for switch closure. On the other hand, the top portion 56 of a rotatably pivoted lever 55 for the stopping pointer is arranged opposite a pin 54 which is provided on a shutter button spindle 53 which is in turn urged resiliently upward by a spring 52. The lever 55 is jointly connected with a shutter speed-determining lever 59 pivotally mounted on a pin 58. Moreover, the rear portion 60 of shutter speed-determining lever 59 is arranged in the region of shutter blade 44, awaiting to take positions in accordance with high and low brightness degrees, i.e. impact-repulsion position A at shutter speed 1/100 second and position B at a speed of 1/30 second. Furthermore, the pointer-stopping lever 55 is energized to move counterclockwise by a spring 61 and constituted of a first portion 63 having a concentrical relation with a meter pointer 62 and a second portion 64 stepwise-connected to portion 63. In addition, the left end of pointer-stopping lever 55 (beyond the portion corresponding to pin 54) is placed opposite a switch lever 65.

Thus, the operational manner in the device referred to above will be described in the following: the counter-clockwise energization of meter pointer-stopping lever 55 is opposed by pin 54 of shutter button spindle 53, and when said shutter button is pushed down, said lever follows the descending of pin 54 and revolves counter-clockwise, thereby the meter pointer 62 indicating an appropriate exposure position by the light of the object to be photographed, i.e. as received by light receiving portion 66, is butted with the first stopping portion 63 (in the case of high brightness) to fix the stopping position. Therefore, the lever 59 assumes the A-position through the appropriate engagement between pin and slot, and operates the driving member 47 and revolves shutter blade 44 clockwise to open the lens 43.

Furthermore, shutter blade 44 impinges lever 59 which awaits said blade 44 at the A-position and simultaneously returns by its own energization to cover lens 43 and finish the exposure. In this case, a high speed exposure of 1/100 second is obtainable, since the return stroke is a short distance up to A-position and the repulsion, return and other relationship.

When the brightness is low, the meter pointer 62 will deviate to the right and be out of the high speed range of photographing, and be opposite the second stopping portion 64. When the shutter button spindle 53 is pushed the pointer-stopping lever 55 revolves describing a large curve and lever 59 assumes the B-position to cause the shutter blade to pivot beyond the A-position, i.e. the repulsion point. The end 56 of lever 55 pushes the switch lever 65 in the final period of rocking, i.e. in advance of the closure of switch lever 50 in order to close the synchronous circuit of flash bulb 49 for ignition. In this case, the shutterspeed becomes 1/30 second, because the passage becomes longer and the repulsive force is not added at the beginning of the returning period, and is coincident with the time leg of the flash bulb, thereby enabling flash-photographing.

What we claim is:
1. An automatic exposure control camera comprising:
a shutter release button having first and second arms;
a pointer-locking means connected to said first arm of the release button to lock the ammeter pointer and serve as a stop of a flash cube socket when the release button is actuated only when the brightness of the object is in a predetermined range;
a shutter speed regulating member cooperating with said pointer-locking means;
a switch for lighting a lamp for indicating the need for flash-photographing, said switch being closed by further movement of said pointer-locking means without abutting the ammeter pointer when said ammeter pointer is in a position corresponding to a lower brightness range of the photographing object than the predetermined range;
a flash-photographing diaphragm aperture setting member, and
a pointer-abutting lever normally engaged with said second arm of the release button, the free end of said pointer-abutting lever being engaged with the ammeter pointer as locked by said pointer-locking means so as to adjust the diaphragm aperture depending on the position of the ammeter pointer when the object brightness is in the predetermined range, while when the brightness is lower than said predetermined range, the free end of said pointer-abutting lever is engaged with said flash-photographing diaphragm aperture setting member and cooperates with said pointer-locking means so as to adjust the diaphragm aperture for flash-photographing.

2. An automatic exposure control camera as set forth in claim 1 further comprising a fixed abutting member arranged so that said ammeter pointer may be locked between said fixed member and said pointer-locking means when the latter is lowered by manual actuation of said release button.

3. An automatic exposure control camera as set forth in claim 1 wherein said pointer-locking means has two step portions, one for allowing a smaller stroke of movement of said pointer-locking means while the other allows a larger stroke due to abutment with the ammeter pointer so as to vary the stroke of the shutter blade for controlling the shutter speed suitable for said predetermined brightness range and for said lower brightness range respectively, said shutter blade being adapted to close a switch for igniting the flash bulb under the lower shutter speed condition by abutting of a movable contact of said switch with said shutter blade after having undergone the larger stroke movement.

References Cited
UNITED STATES PATENTS

| | | |
|---|---|---|
| 3,121,379 | 2/1964 | Macomber et al. |
| 3,171,337 | 3/1964 | Fischer _____ 95—11.5 |
| 3,358,571 | 12/1967 | Lange. |
| 3,374,718 | 3/1968 | Hochreiter _____ 95—11.5 XR |
| 3,380,359 | 4/1968 | Landbrecht _____ 95—10 XR |

NORTON ANSHER, Primary Examiner

JOSEPH F. PETERS, Jr., Assistant Examiner

U.S. Cl. X.R.
95—44, 64, 11.5; 240—37.1